Dec. 17, 1946.  N. N. BEASLEY  2,412,764
SAW HORSE
Filed Sept. 17, 1945
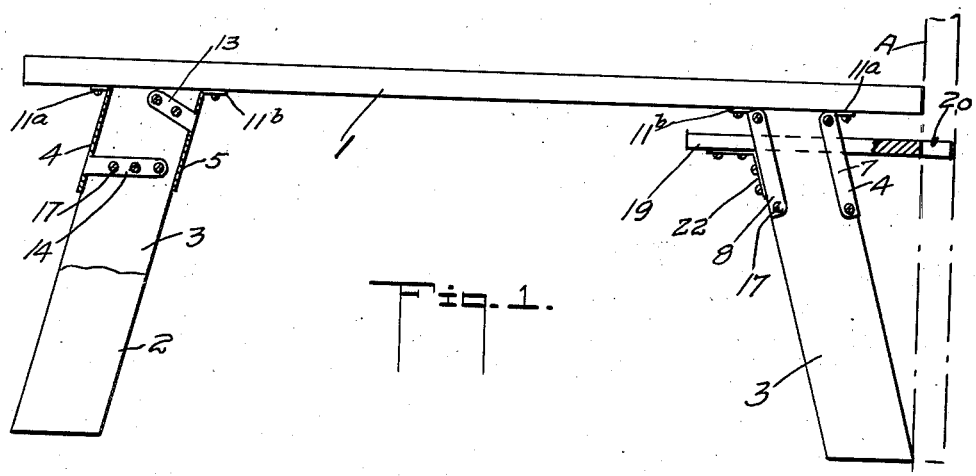
Fig. 1.
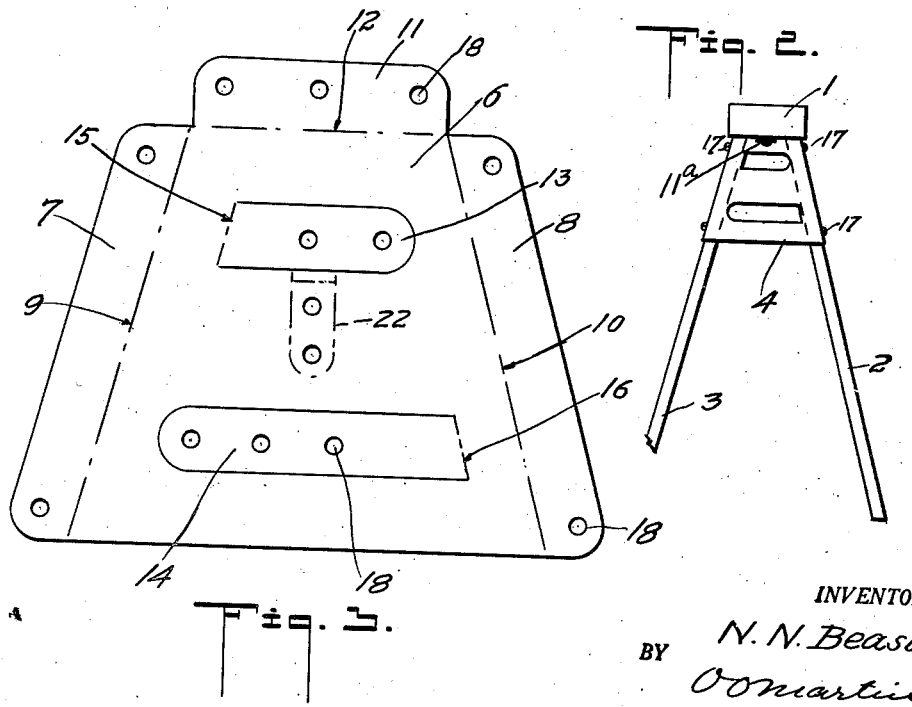
Fig. 2.
Fig. 3.
INVENTOR:
N. N. Beasley.
BY O. O. Martin
ATTORNEY.

Patented Dec. 17, 1946

2,412,764

UNITED STATES PATENT OFFICE 2,412,764

SAWHORSE

Noah N. Beasley, Pasadena, Calif.

Application September 17, 1945, Serial No. 616,709

2 Claims. (Cl. 304—5)

This invention relates to a sawhorse, such as commonly used by carpenters in building construction work and has for its object to provide a simple and inexpensive device which may be quickly shaped and put together with a minimum of effort. Another object is to provide a device so sturdy and well braced that it may be pushed along on rough ground without danger of getting out of shape or coming apart. These and other objects and the advantageous features of the invention are better understood from the following detailed description and by referring to the accompanying drawing, of which:

Fig. 1 is a side elevational view, partly in section, of a device embodying the invention;

Fig. 2 is a substantially corresponding end view of the device; and

Fig. 3 shows the blank of an important part of the invention as it appears before being bent into shape.

The structure of my invention, in the form illustrated in the drawing, comprises a top plate 1, which usually is a piece of two by four or two by six inch lumber, and two pairs of legs 2, 3. The only operation necessary in order to produce these legs is to saw the ends thereof, right and left, at the required angle; in this case about seventeen degrees.

For the purpose of assembling the sawhorse, I provide two pairs of brackets 4, 5, which all are formed from the single blank 6, shown in Fig. 3. The blank is shown made with side flanges 7, 8, which are inclined to match the ends of the legs 2, 3 and are bent on lines 9, 10, at right angles to the body of the blank and in the same direction. The blank is also made with a top flange 11, which is bent in the opposite direction and at the proper angular inclination for alignment with the bottom surface of the plate 1, substantially as indicated at 11a and 11b in Fig. 1.

As indicated in Fig. 3, the blank is also pierced in order to provide two lips 13, 14, which are bent on lines 15, 16 in the same direction as the flanges 7, 8 and parallel therewith. These forming operations should, of course, be completed at the time the blank is made so that it merely becomes necessary for the workman to slip the legs into the spaces between the flanges and lips until the ends of the legs register with the flanges 11a, 11b. The parts may then be rigidly combined by means of screws 17, which are entered through perforations 18 of the brackets.

One of the building construction operations for which the sawhorse is indispensable is the trimming and fitting of doors and window sashes. In order to facilitate such operations, I have provided a guide in the form of a bar of wood 19, in the end of which is cut a notch 20 of a size to receive the part A to be trimmed. This guide is seated in the openings which are left in the brackets after the lips have been formed, and it may be anchored on a small angle 22. The latter may be bolted or welded in position on the bracket and fastened to the bar 19 by suitable means such as the screw 17.

It is seen from the foregoing description that I have provided an extremely simple, economical and sturdy sawhorse constructure. The top plate rests solidly on the legs and is by the bracket tied thereto against both side and end strains by screws or bolts, of which as many may be employed as may be found necessary.

I claim:

1. A device for fastening the top plate and legs of a sawhorse together comprising, pairs of metal brackets, each bracket having its top edge abutting the underside of said plate and made with flaring flanges along the side edge thereof, said flanges being bent at right angles to rest against the outer side surfaces of the legs, lips being extruded from the body of the bracket parallel with said flanges to rest against the inner side surfaces of the legs, means fastening said flanges and lips to the legs, a notched guide bar seatable in the perforations of the brackets out of which said lips are bent, and means anchoring said bar on one of the brackets.

2. A device for fastening the top plate and legs of a sawhorse together comprising, pairs of metal brackets, each bracket having its top edge abutting the underside of said plate and being made with flaring flanges along the side edges thereof, said flanges being bent at right angles to rest against the outer side surfaces of the legs, and with a top flange abutting the underside of the plate, lips being extruded from the body of the bracket parallel with side flanges to rest against the inner surfaces of the legs, means fastening said flanges and lips to the legs and top plate, a notched guide bar seatable in the perforations of the brackets out of which said lips are bent, and means anchoring said bar on one of the brackets.

NOAH N. BEASLEY.